Aug. 5, 1941.  A. HAMMERSTEIN  2,251,791
TWINE CONTAINING AND CUTTING DEVICE
Filed July 25, 1939
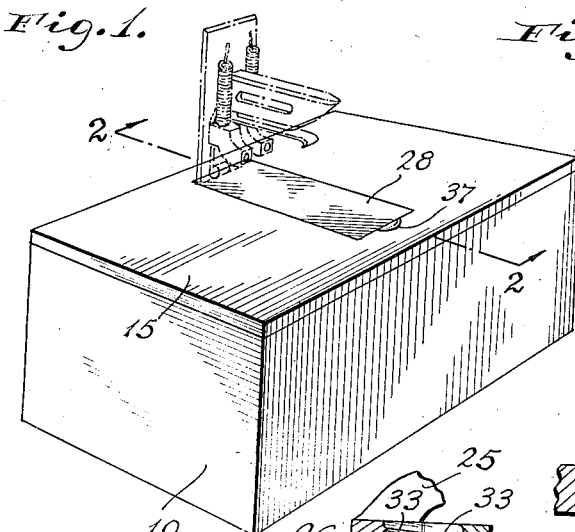
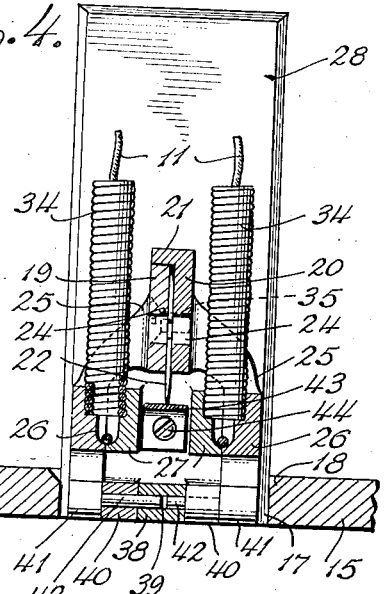
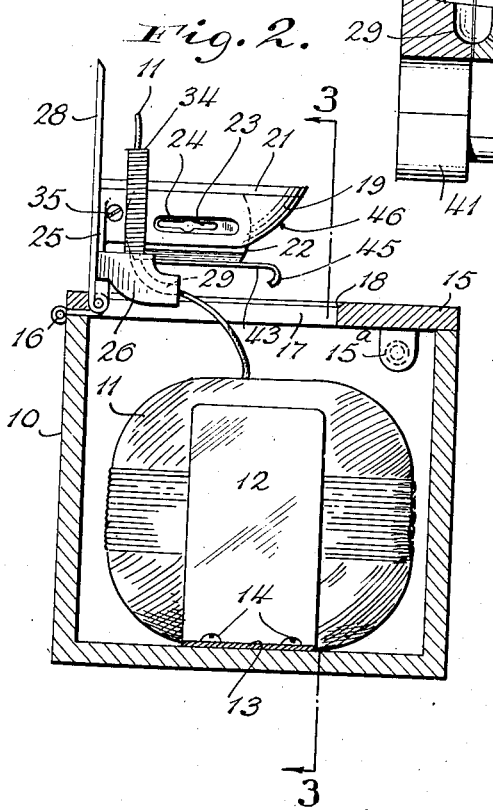
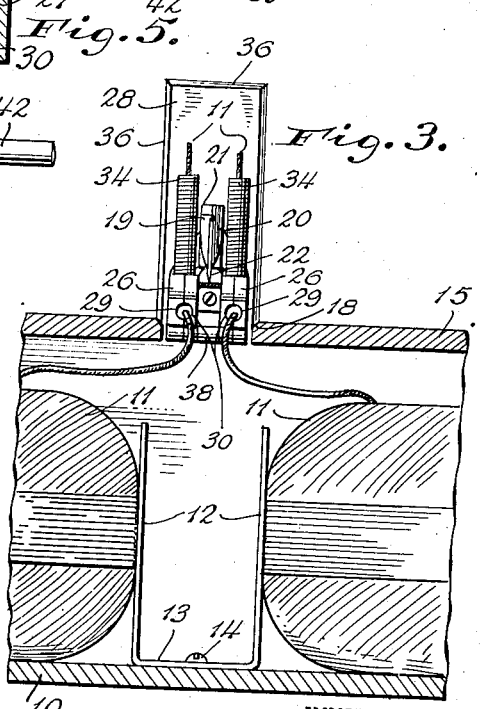
INVENTOR.
ARTHUR HAMMERSTEIN
BY
John A. Kehlbeck
ATTORNEY Patented Aug. 5, 1941

2,251,791

UNITED STATES PATENT OFFICE 2,251,791

TWINE CONTAINING AND CUTTING DEVICE

Arthur Hammerstein, Great Neck, N. Y.

Application July 25, 1939, Serial No. 286,359

6 Claims. (Cl. 242—142)

The invention relates to twine containing and cutting devices and has for its object to provide a novel container for one or more balls of twine, and cutting means normally hidden from sight in said container and readily adjustable relatively thereto to an operative position. The invention contemplates further a novel cutting means whereby the twine may be efficiently cut in selected lengths with a minimum of effort and constructed and operating to permit ready withdrawal of the wine from the container and to maintain a free end portion of said twine in a position of readily accessibility when the cutting means is in its operative position. Other more specific objects will appear from the description hereinafter and the features of novelty will be pointed out in the claims.

In the accompanying drawing which illustrates an example of the invention without defining its limits, Fig. 1 is a perspective view of the device in its normal condition; Fig. 2 is an enlarged cross-section on the line 2—2 of Fig. 1 showing the cutting means in its operative position; Fig. 3 is a fragmentary longitudinal section on the line 3—3; Fig. 4 is a fragmentary view similar to Fig. 3 on a still larger scale, and Fig. 5 is an enlarged section illustrating a detail of the device.

As shown in the drawing, the device comprises a rectangular container 10 of suitable material and arranged to contain two independent balls of twine 11; the latter are maintained in place in said container 10 against interference with each other by the upright legs 12 of a U-shaped member 13 fixed in position by means of screws 14 or the like. A cover 15 is hinged at 16 on the container 10 and is normally maintained in its closed position by gravity or by means of suitable spring controlled detents 15ᵃ of any conventional type. The cover 15 is provided with an opening 17 which, in the illustrated example, is of rectangular form and in any case accommodates the cutting means and enables the same to be adjusted out of sight into the container 10 or to an operative position relatively thereto as will appear more fully hereinafter; the walls of the opening 17 preferably are bevelled as shown at 18 in Figs. 2, 3 and 4.

The novel cutting means includes a holder consisting of two holder sections 19 and 20, one of which is provided with a flange 21 projecting over the upper edge of the other section in engagement therewith as illustrated in Figs. 3 and 4. The sections 19 and 20 are located in parallel surface contiguity to provide a slot for the accommodation of the cutting implement which, as shown, may comprise a conventional safety razor blade 22; the latter in existing forms generally includes an elongated opening 23 which, when the blade 22 is in place in the holder, registers with slots 24 extending lengthwise of the sections 19 and 20, as shown in Fig. 2. The sections 19 and 20 are provided with integral members or brackets 25 projecting in opposite directions in the assembled condition of the holder as illustrated in Fig. 4; at their free ends the brackets 25 carry guide sections 26 constituting parts of cord guides as will appear more fully hereinafter. Co-operating guide sections 27 are located in co-operating relation to the sections 26 to form the complete cord guides; the sections 27 project from and preferably form integral parts of a supporting plate 28. The guide sections 26 and 27 are provided with curved recesses 29 and 30 and with half-portions 31 and 32 of sockets which preferably are formed interiorly with grooves 33. In the assembled condition of the parts the curved recesses 29 of each pair of sections 26 and 27 together form a curved twine channel while the aforesaid half-portions 31 and 32 together constitute the previously mentioned sockets; at the same time the grooves 33 of the sections 26 and 27 fit together to form helical grooves interiorly of said sockets as shown in Fig. 5. Coil springs 34 are fitted into the sockets formed by the half-portions 31 and 32 in screwthreaded connection with the helical grooves thereof; the springs 34 comprise elastic continuations of the curved channels formed by the curved recesses 29 and 30 and in the operative position of the cutting means project upwardly from the aforesaid sockets as illustrated in Figs. 2, 3 and 4. A screw 35 serves to fasten the sections 19 and 20 of the blade holder together and to secure the sections 26 in co-operating relation to the sections 27 with sufficient pressure on the ends of the springs 34 to firmly maintain the latter in place in the sockets formed by the half-portions 31 and 32; at the same time the cutting blade 22 is held in the slot between the sections 19 and 20.

The supporting plate 28 is pivotally mounted at one end of the opening 17 and is preferably provided with bevelled edges 36 to fit the bevelled walls 18 of said opening 17 when said supporting plate 28 occupies its inoperative position as illustrated in Fig. 1; the cover 15 may be provided with a recess 37 adjacent the one end of the opening 17 to facilitate adjustment of the plate 28 to its upright position. The pivotal mounting of the plate 28 and its associated parts consists of a lug 38 suitably fixed on the cover 15 and provided with an aperture 39, and apertured lugs 40 projecting from the supporting plate 28; additional lugs 41 form parts of and depend from the sections 26 and carry pivot pins 42 which extend through the lugs 40 into the aperture 39 of the lug 38 from opposite directions. In the preferred arrangement the pivot pins 42 fit the apertured lugs 40 and the aperture 39 of the lug 38 with sufficient friction to maintain the supporting plate 28 and its associated elements in the operative position shown in Figs. 2, 3, and 4.

To assemble the parts, the lugs 40 of the supporting plate 28 are positioned upon opposite sides of the lug 38 with the apertures of the lugs 40 in axial registry with the aperture 39 of said lug 38. The one holder section 19 is then manipulated to cause the pivot pin 42 of its associated lugs 41 to pass through the co-operating lug 40 and into the aperture 39 of the lug 38; the same proceeding is then followed with the other holder section 20. These operations automatically bring the sections 26 into proper relation to the sections 27, the ends of the spring 34 being placed in position in the sockets formed by the portions 31 and 32 at an appropriate time in the assembly operation; similarly the cutting blade 22 may be inserted into the slot between the sections 19 and 20 at any suitable point in the aforesaid operations. The parts are fixed in the assembled condition by means of the screw 35 which forces the sections 19 and 20 together and also clamps the sections 26 in mating relation with the sections 27 and fixes the ends of the springs 34 securely in place; at the same time the lugs 38, 40 and 41 and the pins 42 constituting the hinge for the supporting plate 28 are firmly combined in operative relation to each other.

The novel device further includes a flat spring 43 extending lengthwise of the active cutting edge of the blade 22 and fixed upon the supporting plate 28 by means of a screw 44 as illustrated in Fig. 4; the free end of the spring 43 is preferably bent or otherwise provided with a finger piece 45 for flexing said spring 43 away from the cutting edge of the blade 22 if and when this may be necessary.

As shown in the drawing, the outer end of the blade holder formed by the holder sections 19 and 20 slopes downwardly and inwardly toward the cutting edge of the blade 22, the sections 19 and 20 being also bevelled transversely to provide a relatively narrow guiding edge 46 for guiding the twine to the cutter as will be more fully explained hereinafter.

In the normal condition the cover 15 of the container 10 is closed and the supporting plate 28 is adjusted to close the opening 17 so that the cutting means extends into the container 10 in the space between the upright legs 12 of the U-shape member 13; in other words, the cutting means occupies an inoperative position and is hidden from sight in said container. In this condition, the device presents an attractive appearance and may be kept in any accessible position ready for use at will. When a length of twine is desired, the supporting plate 28 is pivotally adjusted to the upright position illustrated by dotted lines in Fig. 1 and shown in Figs. 2, 3, and 4 of the drawing to thereby adjust the cutting means to an operative position. The end of the twine 11 which projects upwardly beyond either one of the coil springs 34 is then grasped between the fingers and a pull is exerted thereon to withdraw the twine 11 from one of the balls within the container 10; this operation pulls the twine through the curved guide channel formed by the recesses 29 and 30 and through the particular coil spring 34 which forms an elastic continuation of said curved guide channel. The pull is continued until a sufficient amount of twine has been withdrawn to provide the desired length after which the twine is passed transversely over the free end of the blade holder in contact with the guiding edge 46 thereof. As the twine is thus drawn across the guiding edge 46 the coil spring 34 will be flexed and thereby placed under a tension; as the operation continues, the twine is guided by the guiding edge 46 downwardly into contact with the flat spring 43 in contact with the outer end edge of the cutting blade 22. At this time a pulling force is exerted on the twine toward the supporting plate 28 and assisted by the tension produced on said twine by the spring 34 pulls the twine between the spring 43 and the cutting edge of the blade 22; as this pulling force is continued, the twine will be drawn rearwardly along said cutting edge and will be pressed against the same by the spring 43 whereby said cutting edge will quickly and efficiently cut the twine at the desired point. As soon as the cutting of the twine has been effected the spring 34 will immediately resume its normal position and will carry with it the twine 11, the arrangement being such that a short length of said twine 11 will project outwardly beyond the spring 34 so as to be readily accessible when another length of twine is desired. The construction and operation of the parts are so designed that the length of twine protruding outwardly beyond the spring 34, subsequent to a cutting operation, will be sufficient to enable the same to be easily grasped by the fingers and at the same time will be short enough to avoid any interference with the adjustability of the supporting plate 28 into the opening 17 when use of the cutting means is temporarily no longer desired. With the novel arrangement as set forth, the cutting of the twine may be effected with the assistance of only one hand, the tension of the spring 34 imparted to the twine 11 being sufficient to insure an efficient cutting of the twine without the necessity for using two hands.

The device in all of its forms is simple in construction and requires no particular skill in its operation and at the same time provides a device which, when not in use, is attractive and ornamental in appearance. The cutting blade 22 may be removed from the holder by simply inserting a pencil or other implement through one of the slots 24 into the opening 23 of the blade and then forcing said blade by means of said pencil or other implement forwardly of the holder and beyond the sloping free end thereof; to facilitate this removal of the blade 22, the flat spring 43 may be temporarily pressed away from the cutting edge of the blade by means of the finger piece 45, or its equivalent; a substitute blade may readily be inserted into the holder by simply pushing the same into the slot between the sections 19 and 20 which comprise the blade holder.

While the container 10 in its illustrated form is designed to hold two balls of twine 11, it will be obvious that the container may be otherwise arranged to hold one ball of twine or a greater number than shown in the illustrated example.

Various changes in the specific forms shown and described may be made within the scope of the claims without departing from the spirit of the invention.

I claim:

1. The combination of a hollow base constituting a receptacle for a supply of twine, twine cutting means adjustably mounted on said base and normally lying within the same, said cutting means being selectively adjustable on said base to an operative cutting position exteriorly of said base, and means movable with said cutting means for holding the free end of said twine and shifting the same to an accessible position exteriorly of the hollow base coincidentally with the adjustment of said cutting means to said operative cutting position.

2. The combination of a hollow base constituting a receptacle for a supply of twine, a movable cover for said base provided with an opening, a hinged supporting plate normally closing said opening, twine cutting means carried by said plate and located within said base in the normal position of said plate, the latter being movable to an upright position on said cover to adjust said cutting means to an operative position exteriorly of said base, and means on said plate for guiding the twine, and including a coil spring for placing the twine under tension during cutting operations and for maintaining a free end of said twine in accessible position subsequent to said cutting operations.

3. A twine cutter comprising a supporting plate, a blade holder consisting of two sections located in surface parallelism with each other, a cutting blade between said sections and having its cutting edge at a distance beyond the same, brackets projecting from said holder sections in opposite directions, guide sections carried by said brackets and each provided with a curved recess and with a half-portion of a socket interiorly grooved, co-operating guide sections carried by said plate and each provided with a curved recess and with a half-portion of a socket interiorly grooved, the last named guide sections being located in mating registry with the guide sections carried by the brackets whereby the curved recesses of the associated sections form curved channels and said half-portions provide sockets having interior helical grooves, coil springs each having an end in threaded connection with the helical grooves of said sockets and projecting outwardly beyond the same to form elastic continuations of said curved channels, a screw for clamping said holding sections together and for fixing said guide sections in mating relation and for securing the ends of said coil springs in said sockets, and a flat spring mounted on said plate and extending lengthwise of the cutting edge of said blade, the free ends of said holding sections being bevelled and sloping downwardly and inwardly to provide a guiding edge for guiding the twine to be cut to the cutting blade.

4. A twine cutter comprising a supporting plate, a blade holder consisting of two sections located in surface parallelism with each other and provided with lengthwise slots, a cutting blade between said holding sections provided with an opening arranged to register with said slots and having its cutting edge at a distance beyond said holding sections, a guide section carried by one of said holding sections and provided with a curved recess and with a half-portion of a socket, a co-operating guide section carried by said plate and provided with a curved recess and with a half-portion of a socket, the guide sections being located in mating register with each other whereby the curved recesses thereof form a curved guide channel and said half-portions provide a socket, a coil spring having an end located in said socket and projecting outwardly beyond the same to form an elastic continuation of said curved guide channel, a screw for clamping said holding sections together and for fixing said guide sections in mating relation and for securing the end of said coil spring in said socket, and a flat spring mounted on said plate and extending lengthwise of the cutting edge of said blade.

5. A twine cutter comprising a holder provided with a slot, a cutting blade in said slot having its cutting edge at a distance beyond said holder, means associated with said holder and provided with a guide channel for the twine and with a socket, a coil spring having an end located in said socket and projecting outwardly beyond the same whereby the interior of said coil spring forms an elastic continuation of said guide channel, and a flat spring extending lengthwise of the cutting edge of said blade, the twine being withdrawn through said guide channel and coil spring and passed transversely over and lengthwise of the cutting edge of said blade between said flat spring and said cutting edge whereby said coil spring is flexed to place the twine between itself and said cutting edge under tension to facilitate the cutting of the twine and to return end portion from which a length of twine has been cut to position for subsequent withdrawal and cutting.

6. A twine cutter comprising a holder, a cutting blade carried by said holder with its cutting edge at a distance beyond said holder, means associated with said holder providing an elastic channel through which the twine is withdrawn for cutting, and a flat spring extending lengthwise of the cutting edge of said blade, said holder including a bevelled sloping guiding edge for guiding the twine to the cutting edge of said blade and said elastic channel means placing the withdrawn twine between itself and said cutting edge under tension to facilitate the cutting thereof.

ARTHUR HAMMERSTEIN.